(12) United States Patent
Angervaks et al.

(10) Patent No.: US 12,399,366 B2
(45) Date of Patent: Aug. 26, 2025

(54) WAVEGUIDE STRUCTURE WITH SEGMENTED DIFFRACTIVE OPTICAL ELEMENTS AND NEAR-EYE DISPLAY APPARATUS EMPLOYING THE SAME

(71) Applicant: SAMSUNG ELECTRONICS CO., LTD., Suwon-si (KR)

(72) Inventors: Aleksandr Evgenyevich Angervaks, St. Petersburg (RU); Nikolay Viktorovich Muravyev, Podolsk (RU); Vladimir Nikolaevich Borisov, St. Petersburg (RU); Roman Aleksandrovich Okun, St. Petersburg (RU); Gavril Nikolaevich Vostrikov, Moscow (RU); Mikhail Vyacheslavovich Popov, Krasnogorsk (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 709 days.

(21) Appl. No.: 17/506,291

(22) Filed: Oct. 20, 2021

(65) Prior Publication Data
US 2022/0121031 A1     Apr. 21, 2022

(30) Foreign Application Priority Data

Oct. 20, 2020 (RU) .......................... RU2020134405
Jun. 10, 2021 (KR) ........................ 10-2021-0075630

(51) Int. Cl.
  *G02B 27/01* (2006.01)
  *F21V 8/00* (2006.01)
(52) U.S. Cl.
  CPC ....... *G02B 27/0172* (2013.01); *G02B 6/0051* (2013.01); *G02B 2027/013* (2013.01);
  (Continued)

(58) Field of Classification Search
  CPC ............. G02B 27/017; G02B 27/0172; G02B 2027/0174; G02B 2027/0178; G02B 27/0081
  See application file for complete search history.

(56) References Cited

U.S. PATENT DOCUMENTS 7,483,604 B2    1/2009    Levola
8,115,992 B2    2/2012    Brueck et al.
(Continued)

FOREIGN PATENT DOCUMENTS

CN    1726412 B     5/2010
CN    101945612 B   9/2013
(Continued)

OTHER PUBLICATIONS

Communication dated Jan. 14, 2022, issued by the International Searching Authority in counterpart International Application No. PCT/KR2021/013876 (PCT/ISA/220, 210, 237).
(Continued)

*Primary Examiner* — Bao-Luan Q Le
(74) *Attorney, Agent, or Firm* — Sughrue Mion, PLLC

(57) ABSTRACT

Provided is a waveguide guiding light to a target area, the waveguide including an input-coupling diffractive optical element (DOE) inputting the light into the waveguide, an expanding DOE expanding the light input into the waveguide through the input-coupling DOE, an output-coupling DOE outputting the light expanded in the waveguide by the expanding DOE to an outside of the waveguide, wherein the expanding DOE includes a plurality of expanding segments, and the output-coupling DOE includes a plurality of output-coupling segments.

20 Claims, 12 Drawing Sheets

(52) U.S. Cl.
CPC ............... *G02B 2027/0132* (2013.01); *G02B 2027/0178* (2013.01)

(56) References Cited

U.S. PATENT DOCUMENTS

| | | | |
|---|---|---|---|
| 8,160,411 B2* | 4/2012 | Levola ............... | G02B 27/0172 359/569 |
| 8,189,263 B1* | 5/2012 | Wang ................ | G02B 27/0172 359/633 |
| 8,369,019 B2 | 2/2013 | Baker et al. | |
| 8,446,675 B1* | 5/2013 | Wang ................ | G02B 6/34 359/633 |
| 8,493,662 B2 | 7/2013 | Noui | |
| 8,494,229 B2* | 7/2013 | Jarvenpaa ............. | A61B 3/113 382/117 |
| 8,873,149 B2 | 10/2014 | Bohn et al. | |
| 9,341,846 B2* | 5/2016 | Popovich ............ | G02B 6/0035 |
| 9,372,347 B1 | 6/2016 | Levola et al. | |
| 9,535,253 B2 | 1/2017 | Levola et al. | |
| 9,791,703 B1 | 10/2017 | Vallius et al. | |
| 9,933,684 B2 | 4/2018 | Brown et al. | |
| 9,958,684 B1 | 5/2018 | Robbins | |
| 10,551,622 B2 | 2/2020 | Robbins et al. | |
| 10,564,533 B2 | 2/2020 | Trisnadi et al. | |
| 10,690,915 B2* | 6/2020 | Popovich ............ | G02B 6/0076 |
| 10,698,217 B2 | 6/2020 | Fattal | |
| 10,845,525 B2* | 11/2020 | Schultz .................. | G02B 6/00 |
| 10,935,730 B1* | 3/2021 | Lou .................... | G02B 27/0172 |
| 10,962,787 B1* | 3/2021 | Lou .................... | G02B 6/0036 |
| 11,022,790 B2* | 6/2021 | Luo .................... | G02B 25/001 |
| 11,029,590 B2 | 6/2021 | Trisnadi et al. | |
| 11,079,603 B2 | 8/2021 | Cheng et al. | |
| 11,086,059 B2* | 8/2021 | Schultz ............ | G02B 27/0172 |
| 11,107,288 B2 | 8/2021 | Schowengerdt et al. | |
| 11,435,589 B2* | 9/2022 | Lou ..................... | G02B 6/0016 |
| 11,460,621 B2* | 10/2022 | Popovich ............ | G02B 5/3083 |
| 11,480,722 B2* | 10/2022 | Jiang ................... | G02B 6/0038 |
| 11,609,418 B2* | 3/2023 | Luo .................... | G02B 6/29334 |
| 11,719,887 B2* | 8/2023 | Soskind ............... | G02B 6/3522 385/39 |
| 11,796,747 B2* | 10/2023 | Fan .................... | G02B 27/0081 |
| 11,874,488 B1* | 1/2024 | Fan .................... | G02B 5/1819 |
| 11,906,762 B2* | 2/2024 | Schultz ............ | G02B 27/0081 |
| 2010/0321781 A1* | 12/2010 | Levola ............... | G02B 27/4272 359/569 |
| 2011/0019874 A1* | 1/2011 | Jarvenpaa ............. | A61B 3/113 382/103 |
| 2014/0104665 A1* | 4/2014 | Popovich ............ | G02B 6/0076 359/15 |
| 2016/0291328 A1* | 10/2016 | Popovich ........... | G02B 27/0176 |
| 2017/0102543 A1 | 4/2017 | Vallius | |
| 2017/0299860 A1 | 10/2017 | Wall et al. | |
| 2017/0329149 A1 | 11/2017 | Fattal | |
| 2018/0246330 A1* | 8/2018 | Fattal .................. | G02B 6/0036 |
| 2018/0292653 A1 | 10/2018 | Tervo | |
| 2019/0004321 A1 | 1/2019 | Grey et al. | |
| 2019/0056593 A1* | 2/2019 | Bablumyan ............ | G02B 27/44 |
| 2020/0081246 A1 | 3/2020 | Olkkonen et al. | |
| 2020/0088932 A1* | 3/2020 | Schultz .................. | G02B 6/006 |
| 2020/0116996 A1 | 4/2020 | Lee et al. | |
| 2020/0159026 A1 | 5/2020 | Waldern et al. | |
| 2020/0166691 A1 | 5/2020 | Vartiainen et al. | |
| 2020/0183163 A1* | 6/2020 | Waldern ............... | G02B 6/34 |
| 2020/0192101 A1* | 6/2020 | Ayres ................. | G02B 6/0055 |
| 2020/0209630 A1* | 7/2020 | Schultz ............. | G02B 27/0081 |
| 2020/0225479 A1* | 7/2020 | Chi ..................... | G02F 1/011 |
| 2020/0241304 A1* | 7/2020 | Popovich ........... | G02B 27/0176 |
| 2020/0393666 A1* | 12/2020 | Luo .................... | G02B 6/29334 |
| 2021/0063619 A1 | 3/2021 | Yoon et al. | |
| 2021/0063627 A1 | 3/2021 | Park et al. | |
| 2021/0109273 A1* | 4/2021 | Jiang .................... | G02B 6/0038 |
| 2021/0239991 A1 | 8/2021 | Miller et al. | |
| 2021/0271070 A1* | 9/2021 | Luo .................... | G02B 6/29334 |
| 2021/0278695 A1 | 9/2021 | Cheng | |
| 2021/0278739 A1 | 9/2021 | Brown et al. | |
| 2022/0019333 A1 | 1/2022 | Powderly et al. | |
| 2022/0050232 A1* | 2/2022 | Schultz ................ | G02B 5/1823 |
| 2022/0357578 A1* | 11/2022 | Wei ...................... | G02B 6/0016 |
| 2023/0221503 A1* | 7/2023 | Fan .................... | G02B 27/4205 385/93 |
| 2024/0045132 A1* | 2/2024 | Fan .................... | G02B 27/0172 |

FOREIGN PATENT DOCUMENTS

| | | |
|---|---|---|
| CN | 104116495 A | 10/2014 |
| CN | 104375271 A | 2/2015 |
| CN | 105934902 A | 9/2016 |
| CN | 106662754 A | 5/2017 |
| CN | 105137598 B | 7/2018 |
| CN | 108717235 A | 10/2018 |
| CN | 108873355 A | 11/2018 |
| CN | 108983425 A | 12/2018 |
| CN | 109343222 A | 2/2019 |
| CN | 105229514 B | 3/2019 |
| CN | 208569194 U | 3/2019 |
| CN | 109633918 A | 4/2019 |
| CN | 208721895 U | 4/2019 |
| CN | 208721896 U | 4/2019 |
| CN | 103823267 B | 5/2019 |
| CN | 107250880 B | 7/2019 |
| CN | 107209365 B | 12/2019 |
| CN | 110543022 A | 12/2019 |
| CN | 110546548 A | 12/2019 |
| CN | 110603467 A | 12/2019 |
| CN | 110651211 A | 1/2020 |
| CN | 110651216 A | 1/2020 |
| CN | 110678802 A | 1/2020 |
| CN | 110679147 A | 1/2020 |
| CN | 110869834 A | 3/2020 |
| CN | 111007589 A | 4/2020 |
| CN | 111123524 A | 5/2020 |
| CN | 210776046 U | 6/2020 |
| CN | 111679361 A | 9/2020 |
| CN | 111722317 A | 9/2020 |
| EP | 2 110 701 A1 | 10/2009 |
| EP | 2 163 924 A1 | 3/2010 |
| EP | 2 269 111 B1 | 5/2015 |
| EP | 2 242 419 B1 | 1/2016 |
| EP | 2 329 302 B1 | 11/2019 |
| KR | 10-2020-0003391 A | 1/2020 |
| KR | 10-2020-0022138 A | 3/2020 |
| WO | 2009/101238 A1 | 8/2009 |
| WO | 2009/127849 A1 | 10/2009 |
| WO | 2010/032029 A1 | 3/2010 |
| WO | 2015/081313 A9 | 6/2015 |
| WO | 2015/184413 A1 | 12/2015 |
| WO | 2017060665 A1 | 4/2017 |
| WO | 2017083160 A1 | 5/2017 |
| WO | 2017/180403 A1 | 10/2017 |
| WO | 2018/175625 A1 | 9/2018 |
| WO | 2018/175627 A1 | 9/2018 |
| WO | 2018/187105 A2 | 10/2018 |
| WO | 2018/200140 A1 | 11/2018 |
| WO | 2018/213388 A1 | 11/2018 |
| WO | 2018/231754 A1 | 12/2018 |
| WO | 2019/054756 A1 | 3/2019 |
| WO | 2019/185977 A1 | 10/2019 |
| WO | 2020/040794 A1 | 2/2020 |

OTHER PUBLICATIONS

Communication issued Apr. 26, 2021 by the Russian Patent Office in counterpart Russian Patent Application No. 2020134405.
Communication issued Jul. 8, 2021 by the Russian Patent Office in counterpart Russian Patent Application No. 2020134405.

* cited by examiner

EXPANDING SEGMENTS AND OUTPUT-COUPLING SEGMENTS ARE NOT SUPERIMPOSED

EXPANDING SEGMENTS AND OUTPUT-COUPLING SEGMENTS ARE SUPERIMPOSED

WAVEGUIDE STRUCTURE WITH SEGMENTED DIFFRACTIVE OPTICAL ELEMENTS AND NEAR-EYE DISPLAY APPARATUS EMPLOYING THE SAME

CROSS-REFERENCE TO RELATED APPLICATIONS

This application is based on and claims the benefit of Russian Patent Application No. 2020134405, filed on Oct. 20, 2020, in the Russian Patent Office, and claims priority under 35 U.S.C. § 119 to Korean Patent Application No. 10-2021-0075630, filed on Jun. 10, 2021, in the Korean Intellectual Property Office, the disclosures of which are incorporated herein by reference in their entireties.

BACKGROUND

1. Field

The disclosure relates to a waveguide structure with segmented diffractive optical elements (DOEs) and a near-eye display apparatus employing the same.

The disclosure is applicable in the design of virtual/augmented reality glasses for displaying images in the user's eye area, and in the design of display backlight panels.

2. Description of Related Art

Current augmented reality systems are based on the use of optical waveguides. An optical waveguide usually includes three or more diffraction optical elements (DOEs) that perform different functions. The main functions of the DOEs are introduction of light into the waveguide propagation mode due to total inner reflection (TIR) which is an input-coupling function, pupil dilation based on a projection system which is a dilation function, and light output from the waveguide which is an output-coupling function. These functions are performed by means of DOEs, which are referred to, respectively, as an input-coupling DOE, an expanding DOE, and an output-coupling DOE.

The waveguides according to related art use continuous (non-segmented) DOEs, located, as a rule, on separate areas of the waveguide, which requires the use of waveguides having a large area.

Another and more important problem of the waveguide according to related art is the quality of the displayed image. Low image quality is caused by local defects of the waveguide surface. FIG. 1 shows diagrams illustrating the influence of the thickness and quality of the waveguide surface on the quality of the displayed image. As shown in FIG. 1, local defects of the waveguide surface result in differences between the exit pupils and multiple superimposed images with a slight angular displacement entering the user's eye (pupil), resulting in an image blur. In related art, there are two methods to solve the problem of improving the quality of a displayed image. The first method is to create a waveguide with a very high surface quality. However, the first method, when manufacturing thin waveguides, is very expensive. The second method is to increase the thickness of the waveguide, which leads to a decrease in the density of the exit pupils, due to which the user always receives as few identical angular components as possible (the direction of propagation of a plane light wave, unique for each point of the image) from different exit pupils. However, this second method does not make it possible to use the waveguides with a thickness of less than 0.7-0.9 mm, which leads to an increase in the thickness of the system.

Another drawback of the methods in related art is low efficiency of the system and the uneven brightness of the displayed image.

When developing a waveguide for an augmented reality system, the waveguide is made in such a way that the displayed image falls into the pupil of the user's eye in the largest possible field of view of the user's eye. In this case, it is required to output the light from the waveguide over a large area, which increases with an increase in the field of view of the projection system, so that the light output from each point of the output-coupling DOE is incident on the user's eye motion area (the area within which the eye, while moving, may see the whole virtual image, losslessly, an eye motion box (EMB)). DOEs included in waveguides of related art at every point on the surface of the waveguide emit light in all directions due to the field of view of the projection system. In this case, a significant part of the light is not incident on the EMB. FIG. 2 is a diagram illustrating the problem of the presence of light loss when displaying images according to related art. As shown in FIG. 2, the significant part of the light cannot enter the pupil of the user's eye, which leads to loss in light, and the overall efficiency of the system becomes low.

The brightness of the light propagating in the waveguide decreases with distance from the input-coupling DOE. As a result, the image outputted through the output-coupling DOE, which has constant parameters at each of its points, will have uneven brightness. Uneven brightness of the displayed image leads to a decrease in the EMB, because the brightness of the image quickly decreases over the output-coupling area.

SUMMARY

Provided are a compact waveguide and a near-eye display apparatus employing the same.

Provided are a waveguide with improved quality of an output image and a near-eye display apparatus employing the same.

Provided are a waveguide having a wide an eye motion box (EMB) and a wide viewing angle, and a near-eye display apparatus employing the same.

The technical problems to be solved are not limited to the technical problems as described above, and other technical problems may exist.

Additional aspects will be set forth in part in the description which follows and, in part, will be apparent from the description, or may be learned by practice of the presented embodiments of the disclosure.

According to an aspect of an example embodiment, there is provided a waveguide guiding light to a target area, the waveguide including an input-coupling diffractive optical element (DOE) inputting the light into the waveguide, an expanding DOE expanding the light input into the waveguide through the input-coupling DOE, an output-coupling DOE outputting the light expanded in the waveguide by the expanding DOE to an outside of the waveguide, wherein the expanding DOE includes a plurality of expanding segments, and the output-coupling DOE includes a plurality of output-coupling segments.

As a distance from the input-coupling DOE increases, a density of each of the plurality of expanding segments may decrease and a density of each of the plurality of output-coupling segments may increase.

An area including the plurality of expanding segments on the waveguide and an area including the plurality of output-coupling segments on the waveguide may at least partially intersect.

The plurality of expanding segments and the plurality of output-coupling segments may not intersect with each other.

At least one of the plurality of expanding segments may partially intersect with at least one of the plurality of output-coupling segments.

At least one of the plurality of expanding segments may be partially aligned with at least one of the plurality of output-coupling segments.

A diffraction efficiency of the plurality of expanding segments may be equal to a diffraction efficiency of the plurality of output-coupling segments.

Each of the plurality of expanding segments may have a first diffraction efficiency, each of the plurality of output-coupling segments may have a second diffraction efficiency, and the first diffraction efficiency and the second diffraction efficiency may not be equal to each other.

Diffraction efficiencies of at least one of the plurality of expanding segments or the plurality of output-coupling segments may vary based on locations of the at least one of the plurality of expanding segments or the plurality of output-coupling segments on a surface of the waveguide.

The plurality of expanding segments and/or the plurality of output-coupling segments may have a circle shape, an arc shape, a sector shaper, a circle segment shape, or a polygon shape.

Adjacent segments of the plurality of expanding segments and adjacent segments of the plurality of output-coupling segments may be spaced apart from each other on the waveguide.

Distances between the adjacent segments of the plurality of expanding segments and distances between the adjacent segments of the output-coupling segments may be equal to each other.

Eistances between the adjacent expanding segments of the expanding DOE may be respectively a first distance, and distances between the adjacent output-coupling segments of the output-coupling DOE may be respectively a second distance, and the first distance may not be equal to the second distance.

Distances between the adjacent segments of at least one of the plurality of expanding segments and the plurality of output-coupling segments may vary based on locations of the at least one of the plurality of expanding segments or the plurality of output-coupling segments on a surface of the waveguide.

A size of each of the plurality of expanding segments may be equal to a size of each of the plurality of output-coupling segments.

A size of each of the plurality of expanding segments may be a first size, and a size of each of the plurality of output-coupling segments may be a second size, and the first size and the second size may not be equal to each other.

Sizes of at least one of the plurality of expanding segments or the plurality of output-coupling segments may vary based on locations of the at least one of the plurality of expanding segments or the plurality of output-coupling segments on a surface of the waveguide.

A period and an effective thickness of each segment of the plurality of expanding segments and a period and an effective thickness of each of the plurality of output-coupling segments may correspond to a location of the target area such that a diffraction efficiency of each segment is maximum with respect to the light output from the waveguide toward the target area.

According to another aspect of an example embodiment, there is provided a near-eye display apparatus including a projector projecting light of an image, and a waveguide including an input-coupling diffractive optical element (DOE) inputting the light into the waveguide, an expanding DOE expanding the light input into the waveguide by the input-coupling DOE, an output-coupling DOE outputting the light expanded by the expanding DOE in the waveguide to an outside of the waveguide, wherein the expanding DOE includes a plurality of expanding segments, and the output-coupling DOE includes a plurality of output-coupling segments, and wherein the waveguide guides the light projected by the projector to a target area, the target area being a user's eye motion box.

According to another aspect of an example embodiment, there is provided a near-eye display apparatus including a left eye element including a first projector projecting light of an image and a first waveguide, and a right eye element including a second projector projecting light of an image and a second waveguide, wherein each of the first waveguide and the second waveguide includes an input-coupling diffractive optical element (DOE) inputting the light into the waveguide, an expanding DOE expanding the light input into the waveguide by the input-coupling DOE, an output-coupling DOE outputting the light expanded by the expanding DOE in the waveguide to an outside of the waveguide, wherein the expanding DOE includes a plurality of expanding segments, and the output-coupling DOE includes a plurality of output-coupling segments, and wherein the waveguide is provided in each of the left eye element and the right eye element such that plurality of output-coupling segments outputting the light projected by the projector are provided opposite to an area including a user's eye.

According to another aspect of an example embodiment, there is provided a waveguide guiding light to a target area, the waveguide including an input-coupling diffractive optical element (DOE) inputting the light into the waveguide, an expanding DOE expanding the light input into the waveguide through the input-coupling DOE, an output-coupling DOE outputting the light expanded in the waveguide by the expanding DOE to an outside of the waveguide, wherein the expanding DOE includes a plurality of expanding segments, and the output-coupling DOE includes a plurality of output-coupling segments, wherein an area including the plurality of expanding segments on the waveguide and an area including the plurality of output-coupling segments on the waveguide at least partially intersect, and wherein a diffraction efficiency of the plurality of expanding segments is equal to a diffraction efficiency of the plurality of output-coupling segments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
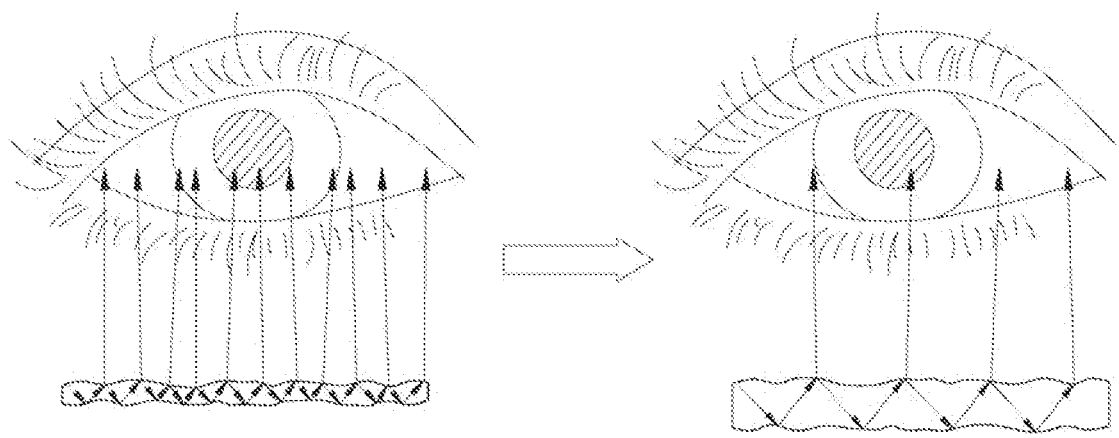
FIG. 1 shows diagrams illustrating the influence of thickness and quality of a waveguide surface on the quality of a displayed image.
Figure 2:
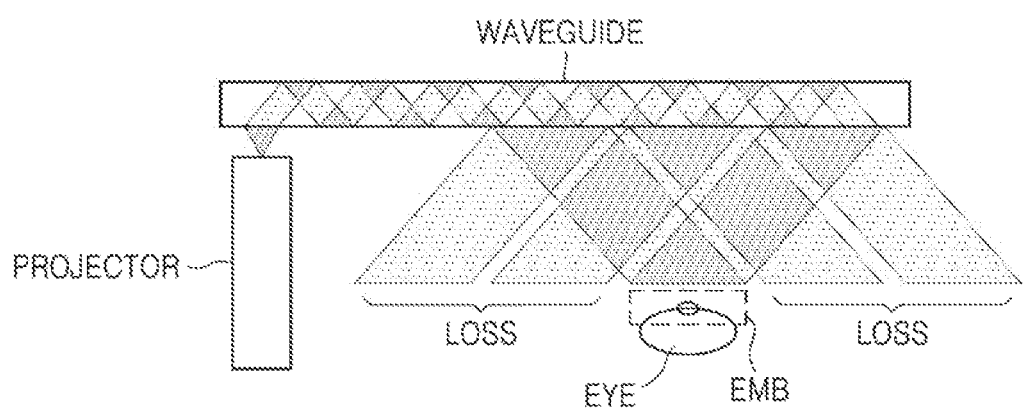
FIG. 2 is a diagram illustrating the problem of the presence of light loss when displaying images of devices according to related art.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Throughout the disclosure, the expression "at least one of a, b or c" indicates only a, only b, only c, both a and b, both a and c, both b and c, all of a, b, and c, or variations thereof.

Although terms used in embodiments of the specification are selected with general terms used at present under the consideration of functions in the disclosure, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the specification should be defined not by the simple names of the terms but by the meaning of the terms and the contents throughout the disclosure.

In the disclosure, segmented diffractive optical element (DOE) may be a diffractive optical element including separate segments that perform the same function (e.g., expanding function, output-coupling function). Individual segments are understood as segments that are grouped in a certain area on the surface of the waveguide and are located at a certain distance from each other and/or have different parameters. The parameters of the segments (for example, the effective DOE thickness, DOE period, DOE efficiency, size) and the distance between segments may be the same for all segments/pairs of adjacent segments or may vary (for example, depending on the location of the segments on the waveguide surface). For example, the parameters of the segments and the distance between segments may vary depending on the location of the segments on the waveguide surface.

Segments of another DOE (DOE of other functionality) and/or sections of the waveguide that are not occupied by diffractive optical elements may be located between the segments of one DOE.

Adjacent segments of one DOE may have different or identical parameters.

Segments of one DOE may be separated by a DOE-free surface of the waveguide, and may be also partially superimposed.

Segments of one DOE may be separated by the DOE-free surface of the waveguide from the segments of another DOE, and may also be partially or completely superimposed on the segments of another DOE.

Each DOE segment may be considered as a separate diffractive optical element, and the segmented DOE as a set of separate DOEs. Here, the set of separate DOEs may be grouped in a certain area, having the same function and located at a certain distance from each other (including number zero) and/or having different parameters. Two adjacent segments of one DOE may be superimposed, but may differ in parameters.

DOE segmentation allows flexible control of its parameters such as, for example, diffraction efficiency, period, and effective thickness of the diffractive structure, within a large area of the DOE. For example, DOE segmentation may include diffractive optical elements having different parameters for different segments and, accordingly, may include diffractive optical elements having different parameters for areas of the waveguide 1. For example, several segmented DOEs with different functions may be arranged in the same area of the waveguide 1, which provides a reduction in the size of the waveguide 1. For example, the period, effective thickness, and angular selectivity of the diffraction structure may be selected separately for each segment in order to increase the efficiency corresponding to a ratio of the amount of light input to a waveguide 1 to the amount of light output from the waveguide 1, of light output to the target area, for example, the EMB area. The diffraction efficiency may be selected separately for each segment, which may ensure uniformity of the displayed image brightness and increase the EMB area. By choosing the distances between the segments and the sizes of the segments, the required density of exit pupils for each individual area of the waveguide may be set, and thus the amount of light output in these areas may be controlled.

Hereinafter, the disclosure will be described in detail with reference to the accompanying drawings.

Figure 3:
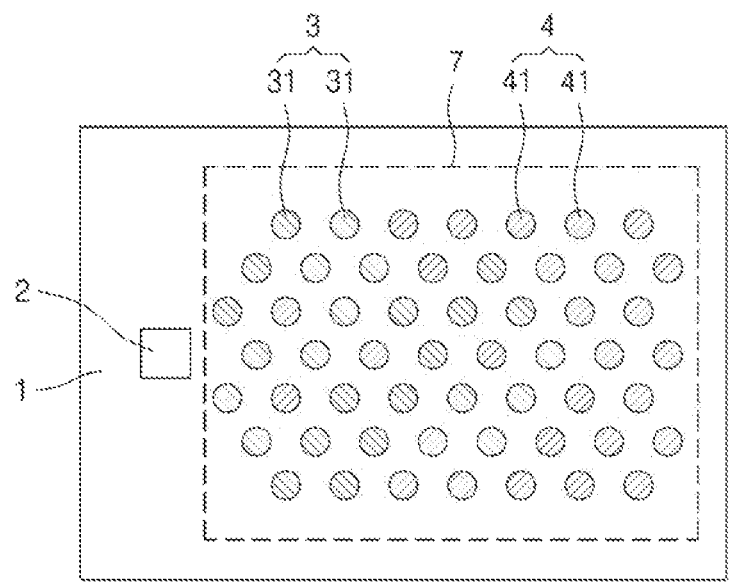
FIG. 3 is a plan view of a waveguide according to an embodiment.

FIG. 3 is a plan view of a waveguide 1 according to an embodiment.

The waveguide 1 according to an embodiment includes an input-coupling diffractive optical element (DOE) 2, an expanding DOE 3 and an output-coupling DOE 4.

The input-coupling DOE 2, the expanding DOE 3 and the output-coupling DOE 4 are not limited to a specific type of DOE. For example, holographic DOEs, film, rifled DOEs and other DOEs may be used in the input-coupling DOE 2, the expanding DOE 3 and the output-coupling DOE 4.

Each of the expanding DOE 3 and output-coupling DOE 4 may include a plurality of segments. The expanding DOE 3 may include extending segments 31, and the output-coupling DOE 4 may include output-coupling segments 41. In FIG. 3, the extending segments 31 are depicted as circles including hatchings extending from the upper left side to the lower right side, and the output-coupling segments 41 are depicted as circles including hatchings extending from the upper right side to the lower left side.

The expanding DOE 3 and the output-coupling DOE 4 are located in an expanding and output-coupling area 7. In an embodiment, the expanding and output-coupling region 7 may be a single area in which expanding and output-coupling are mixed. For example, the expanding segments 31 and the output-coupling segments 41 may be mixed in the expanding and output-coupling area 7. However, embodiments are not limited thereto. In an embodiment, an area in which the expanding segments 31 are located and areas in which the output-coupling segments 41 are located may be separated.

As shown in FIG. 3, the input-coupling DOE 2 has the shape of a square, but embodiments are not limited thereto. The input-coupling DOE 2 may have any shape such as rectangle, circle, oval, hexagon, etc. The input-coupling DOE 2 may be located outside of the expanding and output-coupling area 7 in which the expanding and output-coupling DOEs 3 and 4 are located, but embodiments are not limited thereto.

As shown in FIG. 3, the expanding segments 31 and the output-coupling segments 41 may have a round shape, but embodiments are not limited thereto.

Figure 4:
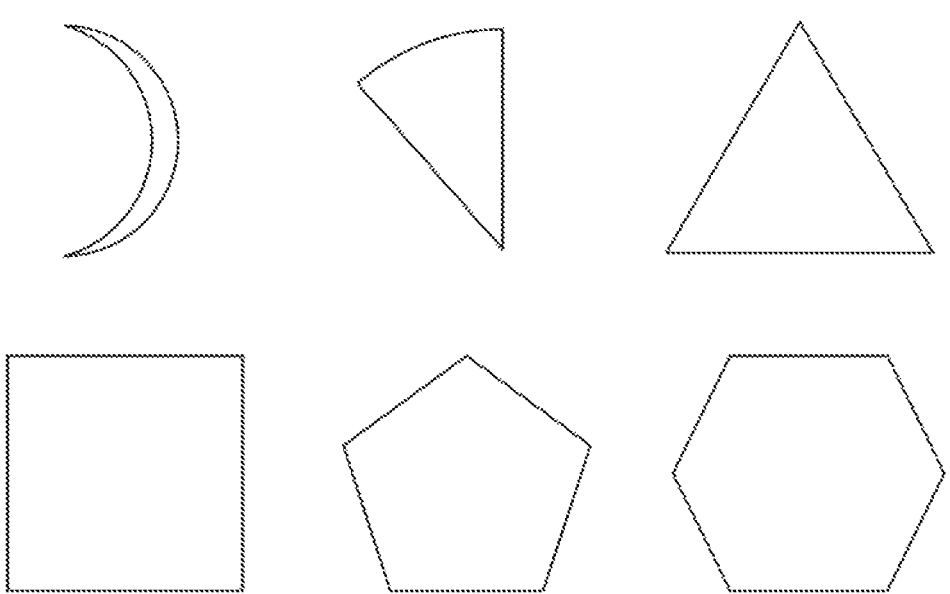
FIG. 4 shows examples of various geometric shapes of expanding and output-coupling segments.

FIG. 4 shows examples of various geometric shapes of the expanding and output-coupling segments 31 and 41. As shown in FIG. 4, the expanding and output-coupling segments 31 and 41 may have the form of, for example, a circle, arc, sector, segment of a circle, polygon (including a triangle, square, hexagon, etc.) The shapes of the expanding and output-coupling segments 31 and 41 may be selected arbitrarily depending on a requested task.

Figure 5:
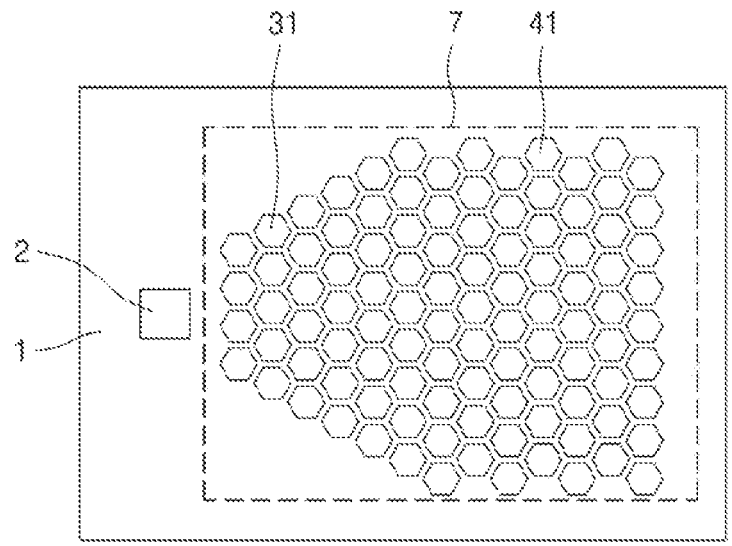
FIG. 5 is a plan view of a waveguide according to an embodiment.

FIG. 5 is a plan view of the waveguide 1 according to an embodiment. Referring to FIG. 5, the expanding and output-coupling segments 31 and 41 may be in the shape of a hexagon and arranged in a hexagonal honeycomb structure. The shape and arrangement of the expanding and output-coupling segments 31 and 41 shown in FIG. 5 are example, and embodiments are not limited thereto.

An operation of the waveguide 1 according to the embodiment of the disclosure will be described with reference to FIG. 3.

Light entering the input-coupling DOE 2 from a projector (9 of FIG. 22), enters the waveguide 1, begins to propagate in the direction of the expanding and output-coupling DOEs 3 and 4, and enters the expanding and output-coupling segments 31 and 41. The expanding segments 31 expand the input pupil. Light incident on a diffraction structure of the expanding segments 31 is diffracted and is partially redirected in the other direction (first diffraction order), while the remaining light continues to propagate in the same direction (zero diffraction order). The light diffracted from the expanding segments 31 in the zero and first diffraction orders continue to propagate in the waveguide 1 due to the total internal reflection effect and may be incident on other segments (i.e. the expanding and/or output-coupling segments 31 and 41). The light which is incident on a diffraction structure of the output-coupling segment 41 is diffracted and is partially removed from the waveguide 1, while the remaining part of the light continues to propagate in the same direction.

The parameters (for example, diffraction efficiency, effective thickness, and size) of the expanding and output-coupling segments 31 and 41 and the location of the expanding and output-coupling segments 31 and 41 on the surface of the waveguide 1 are chosen so that light propagating in the waveguide 1 from the input-coupling DOE 2 reaches all of the output-coupling segments 41 and is output predominantly in the direction of a target area with the required intensity. For example, when using the waveguide 1 of the embodiment in a near-eye display apparatus, the light from each of the output-coupling segments 41 may be output mainly in the direction of an eye motion box (EMB) area and may have a uniform intensity over the entire output-coupling area of the waveguide 1 to ensure uniform brightness of a displayed image throughout the EMB.

In an embodiment, the segments of the expanding DOE 3 and the output-coupling DOE 4 may be arranged so that as the distance from the input-coupling DOE 2 in the direction of light propagation increases, the density (frequency) of the expanding DOE segments 31 decreases, and the density (frequency) of the output-coupling DOE segments 41 increases.

In an embodiment, the period and the effective thickness of the diffractive structure of each of the expanding segments 31 and the output-coupling segments 41 may be associated with the location of the target area so that the diffraction efficiency is maximum for the light output from the waveguide 1 towards the target area.

When using a waveguide with segmented DOEs in the near-eye display apparatus, the angular selectivity, determined by the period and effective thickness, may be set separately for each segment so that the light from each segment (from each area of the segments of the waveguide 1) is predominantly (i.e., with maximum efficiency) output in the direction of the target area (EMB). Due to this, most of the light output by the waveguide 1 may be incident on the target area, the light loss due to illumination of other areas than the target area may be minimal, and the efficiency of the system using the waveguide 1 may increase.

Figure 6:
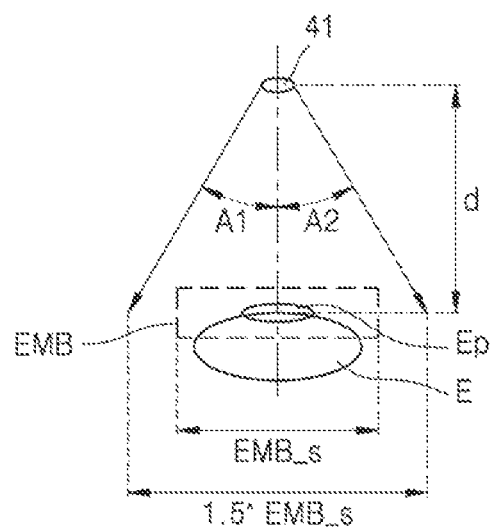
FIG. 6 is a diagram showing a location of an eye motion box (EMB) relative to a segment of an expanding diffractive optical element (DOE) and an angular scope of the segment.
Figure 7:
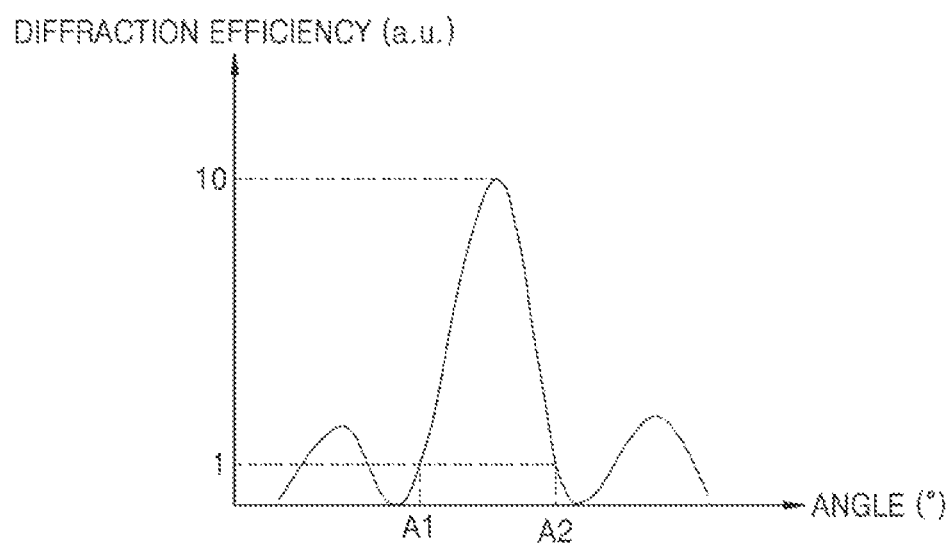
FIG. 7 is a diagram showing an example of an angular selectivity of the DOE segment of FIG. 6.

FIG. 6 is a diagram showing a location of an EMB relative to a segment of an expanding DOE and an angular scope of the segment. FIG. 7 is a diagram showing an example of an angular selectivity of the DOE segment of FIG. 6.

An example of the angular selectivity that may be set for an output-coupling segment is described with reference to FIGS. 6 and 7.

In FIG. 6, d denotes a distance of an input pupil of a user's eye from the output-coupling segment 41, and EMB_s denotes a width of an EMB area. A1 and A2 denote angles of light output from the output-coupling segment 41. An expanded EMB area is conditionally specified area, and the user's eye pupil may not occur outside of the expanded EMB area. In an embodiment, the ranges of the angles A1 and A2 correspond to the expanded EMB area having a width of 1.5*EMB_s. For example, the ranges of the angles A1 and A2 may be given by Equation 1 below.

$$A2-A1 \leq 1.5*\arctan(EMB\_s/d)$$ [Equation 1]

In FIGS. 7, A1 and A2 may be the angles corresponding to 1/10 (which is an approximate selected value) of the maximum diffraction efficiency of the output-coupling segment at both ends of the maximum value of the diffraction efficiency.

In the embodiment, the angular selectivity is set so that for the light output in a target direction (in the direction of the user's pupil), the diffraction efficiency (and, accordingly, the brightness) is maximum. At the same time, the diffraction efficiency for beams located at the edges of the extended EMB area is reduced to 1/10 of the maximum value as shown in FIG. 7. Thus, most of the light from a particular output-coupling segment is output in the target direction according to the angular selectivity described above.

Next, the arrangement of the expanding segments 31 and the output-coupling segments 41 will be described.

Figure 8:
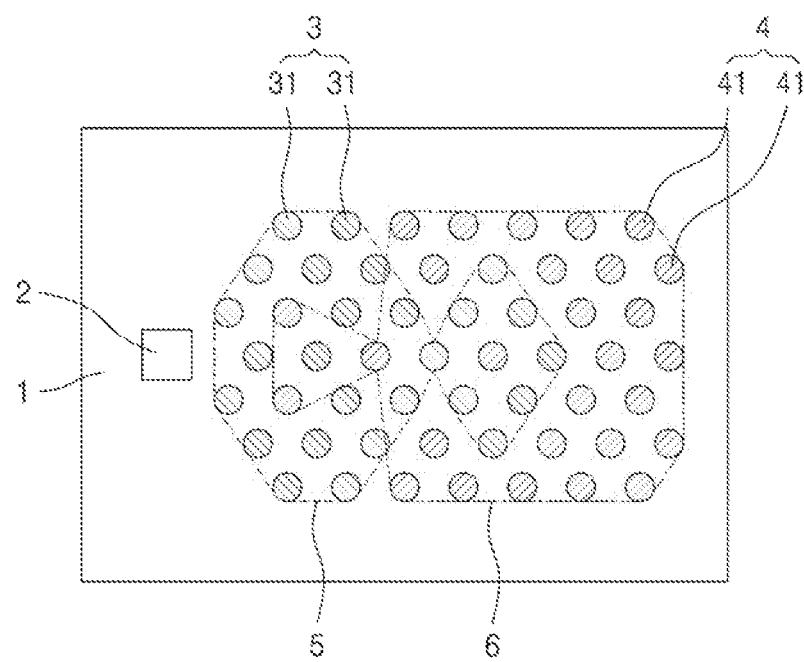
FIG. 8 is a diagram showing the arrangement of expanding and output-coupling segments according to an embodiment.

FIG. 8 is a diagram showing the arrangement of the expanding segments 31 and the output-coupling segments 41 according to an embodiment.

Referring to FIG. 8, the area(s) where the expanding DOE 3 are located and the area(s) where the output-coupling DOE 4 are located may intersect or superimpose each other. An area 5 (i.e., a propagation area) of location of the expanding segments 31 and an area 6 (i.e. an output-coupling area) of location of the output-coupling segments 41 may at least partially intersect, thereby ensuring the reduction of the size of the waveguide 1.

Figure 9:
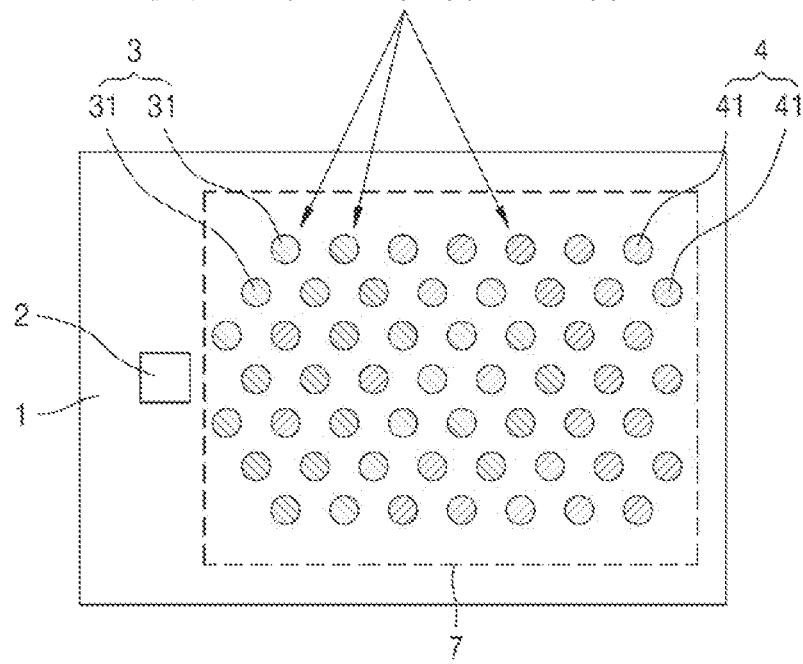
FIG. 9 is a diagram showing the arrangement of expanding and output-coupling segments according to an embodiment.

FIG. 9 is a diagram showing the arrangement of the expanding segments 31 and the output-coupling segments 41 according to an embodiment.

Referring to FIG. 9, the expanding segments 31 and the output-coupling segments 41 may be located separately from each other and not intersect or superimpose each other. The expanding segments 31 and the output-coupling segments 41 may be more easy to implement because the expanding segments 31 and the output-coupling segments 41 are not superimposed.

Figure 10:
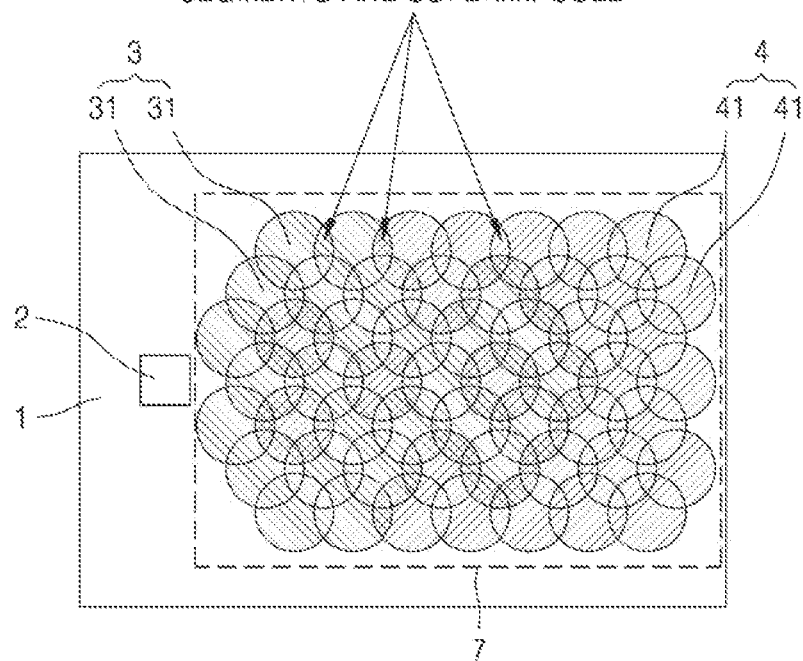
FIG. 10 is a diagram showing the arrangement of expanding and output-coupling segments according to an embodiment.

FIG. 10 is a diagram showing the arrangement of the expanding segments 31 and the output-coupling segments 41 according to an embodiment.

Referring to FIG. 10, at least one of the expanding segments 31 and at least one of the output-coupling segments 41 may partially intersect or superimpose each other or may be aligned to each other. Due to this configuration, both of an output-coupling function and an expanding function may be performed in the same areas of the waveguide 1, which makes it possible to further reduce the size of the waveguide 1 as a whole. In an embodiment, the expanding segments 31 may be provided on a first side of the waveguide 1 and the output-coupling segments 41 may be provided on a second side opposite to the first side of the waveguide 1 so that at least some may be partially interested or superimposed when viewed from the direction normal to the waveguide 1. At this time, the first side and the second side of the waveguide 1 may be an upper side and a lower side (or the lower side and the upper side) of a plate or layer structure. In an embodiment, the expanding segments 31 and the output-coupling segments 41 may be partially superimposed, by recording different holographic diffractive structures in one or a plurality of areas on one side of the waveguide 1.

Figure 11:
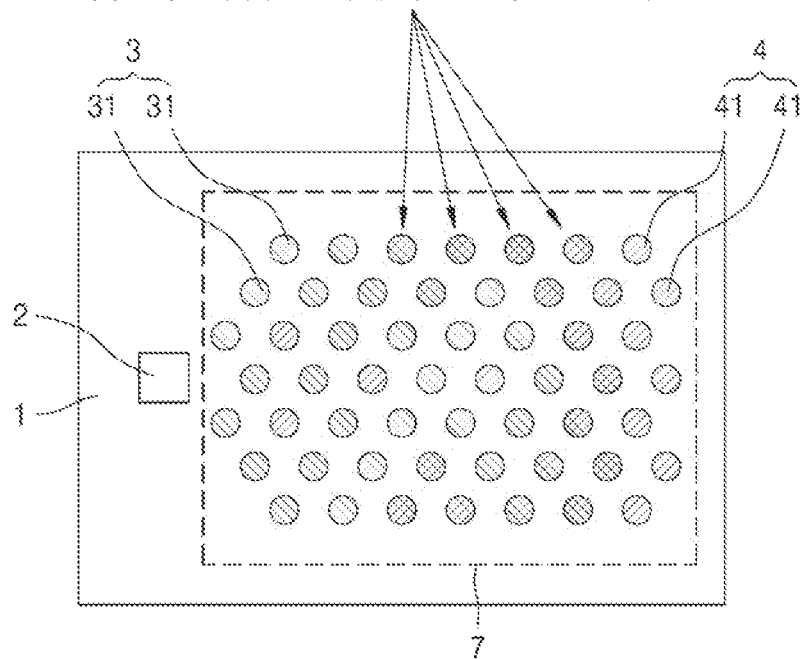
FIG. 11 is a diagram showing the arrangement of expanding and output-coupling segments according to an embodiment.

FIG. 11 is a diagram showing the arrangement of the expanding segments 31 and the output-coupling segments 41 according to an embodiment.

Referring to FIG. 11, at least some of the expanding segments 31 and output-coupling segments 41 may be partially aligned, and thus, both the expanding function and the output-coupling function may be performed in the same areas of the waveguide 1, which makes it possible to further reduce the size of the waveguide 1 as a whole. Here, alignment may be that the segments coincide when viewed from a direction normal to the waveguide 1 and are fully superimposed. FIG. 11 illustrates a case in which the expanding segments 31 and the output-coupling segments 41 are aligned with the same size (diameter), but for additional control over the efficiency of an optical system, the expanding segments 31 and the output-coupling segments 41 may be aligned with different sizes (diameters). In an embodiment, the expanding segments 31 and the output-coupling segments 41 are provided on both sides of the waveguide 1, respectively, so that at least some of the expanding segments 31 and the output-coupling segments 41 are aligned when viewed from a direction normal to the waveguide 1. In an embodiment, the expanding segments 31 and the output-coupling segments 41 may be aligned by recording different holographic diffractive structures on the area(s) of one side of the waveguide 1.

In an embodiment, both of the expanding segments 31 and the output-coupling segments 41 may have the same diffraction efficiency (DE). In an embodiment, the expanding segments 31 have the same first diffraction efficiency, the output-coupling segments 41 have the same second diffraction efficiency, and the first diffraction efficiency and the second diffraction efficiency may not equal to each other. Such embodiments may be relatively easier to implement.

The embodiments described with reference to FIGS. 8 to 11 are described such that the area of the expanding DOE 31 and the area of the output-coupling DOE 4 are at least partially intersected or superimposed, but embodiments are not limited thereto. In an embodiment, the area of the expanding DOE 31 and the area of the output-coupling DOE 4 may be located separately from each other and not intersect or superimpose each other.

Next, the diffraction efficiency of the expanding segments 31 and the output-coupling segments 41 will be described.

Figure 12:
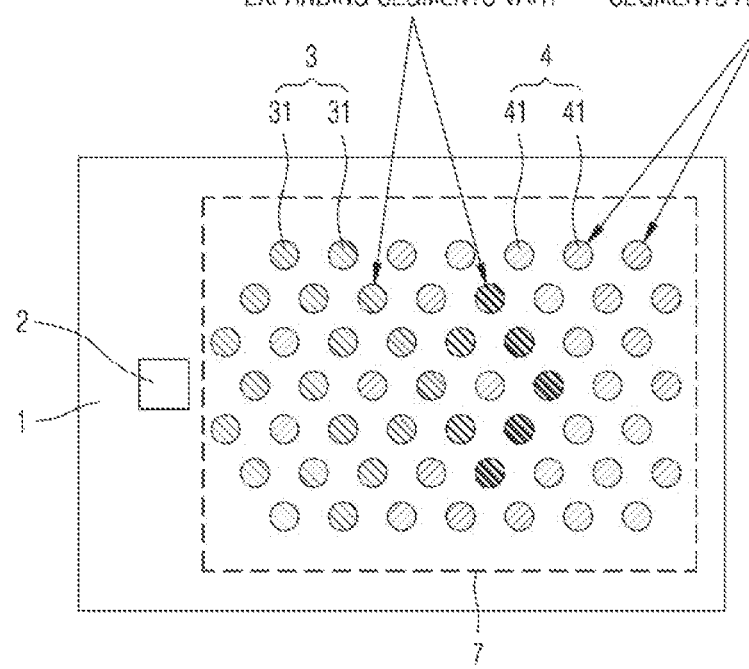
FIG. 12 is a diagram showing the diffraction efficiency of expanding and output-coupling segments according to an embodiment.

FIG. 12 is a diagram showing the diffraction efficiency of the expanding segments 31 and the output-coupling segments 41 according to an embodiment. In FIG. 12, a thickness variation of a hatching marking the expanding segments 31 indicates that at least some of diffraction efficiencies of the expanding segments 31 are different from each other, and a constant thickness of hatching marking the output-coupling segments 41 indicates that diffraction efficiencies of the output-coupling segments 41 are constant. At least some of diffraction efficiencies of the expanding segments 31 may vary depending on locations (coordinates) of the expanding segments 31 on the surface of the waveguide 1. The diffraction efficiencies of the output-coupling segments 41 may be constant irrespective of locations (coordinates) of the output-coupling segments 41 on the surface of the waveguide 1.

Figure 13:
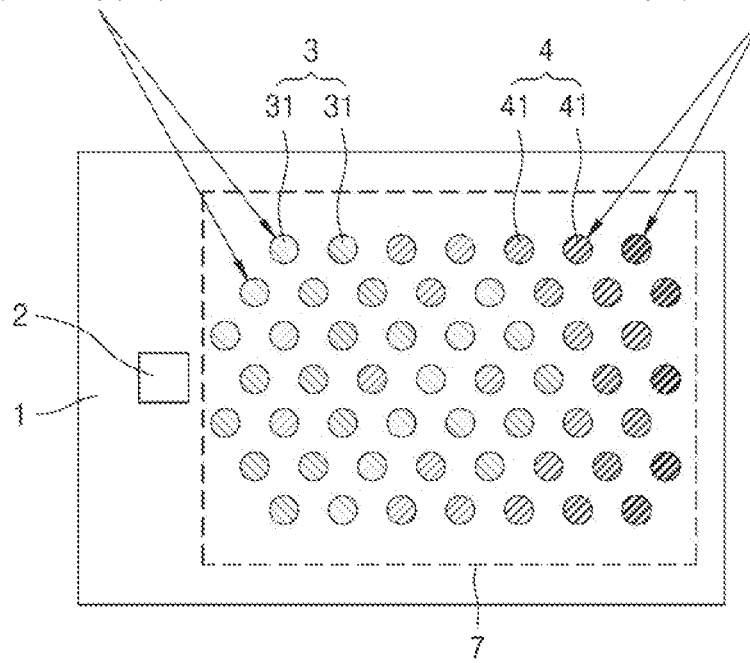
FIG. 13 is a diagram showing the diffraction efficiency of expanding and output-coupling segments according to an embodiment.

FIG. 13 is a diagram showing the diffraction efficiency of the expanding segments 31 and the output-coupling segments 41 according to an embodiment. In FIG. 13, a constant thickness of hatching marking the expanding segments 31 indicates that diffraction efficiencies of the expanding segments 31 are constant, and a thickness variation of a hatching marking the output-coupling segments 41 indicates that at least some of diffraction efficiencies of the output-coupling segments 41 are different from each other. The diffraction efficiencies of the expanding segments 31 may be constant irrespective of locations (coordinates) of the expanding segments 31 on the surface of the waveguide 1. At least some of diffraction efficiencies of the output-coupling segments 41 may vary depending on locations (coordinates) of the output-coupling segments 41 on the surface of the waveguide 1.

Figure 14:
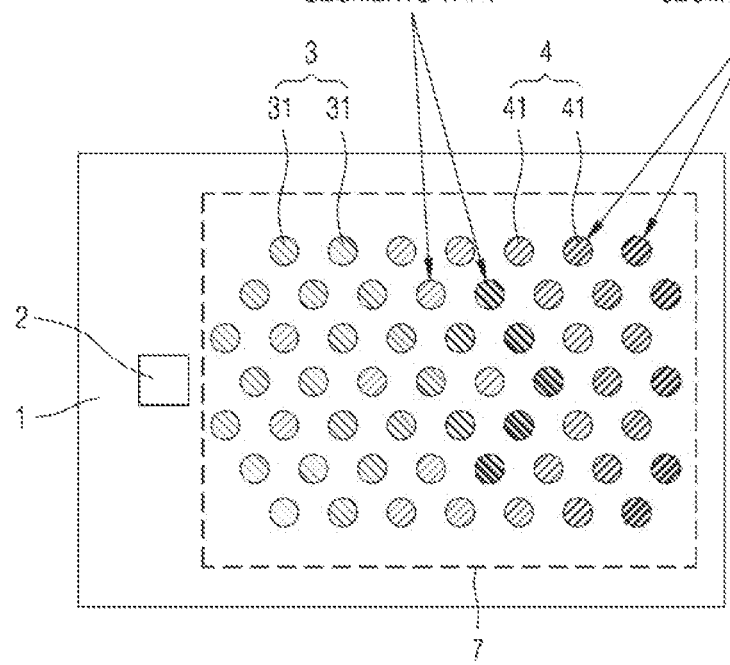
FIG. 14 is a diagram showing the diffraction efficiency of expanding and output-coupling segments according to an embodiment.

FIG. 14 is a diagram showing the diffraction efficiency of the expanding segments 31 and the output-coupling segments 41 according to an embodiment. Referring to FIG. 14, the diffraction efficiency of both the expanding segments 31 and the output-coupling segments 41 may be different from each other. At least some of diffraction efficiencies of the expanding segments 31 and the output-coupling segments 41 may vary depending on coordinates on the surface of the waveguide 1.

In the embodiments of FIGS. 12 to 14, diffraction efficiencies may vary. In an embodiment, diffraction efficiencies of the expanding segments 31 and/or the output-coupling segments 41 may increase with increasing distance from the input-coupling DOE 2. In an embodiment, diffraction efficiencies of the expanding segments 31 and/or the output-coupling segments 41 may increase along a path of beams inside the waveguide 1. In an embodiment, diffraction efficiencies of the expanding segments 31 and/or the output-coupling segments 41 may be proportional to a length of the beam propagation path from the input-coupling DOE 2 to a given point of the waveguide 1. The variation in the diffraction efficiency of the expanding segments 31 and/or the output-coupling segments 41, depending on the coordinates on the surface of the waveguide 1, compensates for a decrease in the brightness of light propagating along the waveguide, which ensures uniformity of light output from the waveguide 1. When using the waveguide 1 in a near-eye display apparatus, an image displayed by the waveguide 1 may have a uniform brightness. Improving a problem of uneven brightness may increase the EMB area.

Next, a distance relationship (i.e. density) between the expanding segments 31 and/or the output-coupling segments 41 will be described.

A method of controlling the brightness of light output from the waveguide 1 according to an embodiment is to vary the density of exit pupils. The higher the density of the exit pupils, the higher the brightness of the light (output from the corresponding area) is, and the lower the density of the exit pupils, the lower the brightness of the radiation is. The density of the exit pupils may be changed by varying the size of the segments and the distances between them.

Figure 15:
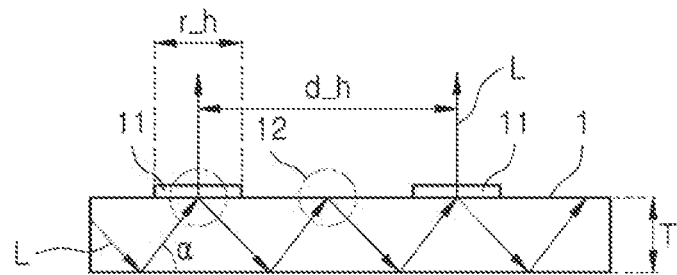
FIG. 15 shows DOE segments separated by an empty space of a waveguide.

FIG. 15 shows DOE segments 11 separated by an empty space of the waveguide 1 according to an embodiment.

Referring to FIG. 15, at least some adjacent segments 11, for example, the adjacent expanding and/or output-coupling segments, the adjacent output-coupling segments 41, or the adjacent output-coupling segments 31 are spaced apart from each other and separated by the empty space with a free surface 12 on which there are no diffractive structures. Due to this, light L propagating in the waveguide 1 in areas of location of the segments 11 does not diffract at every reflection from a wall or walls, when the segments 11 are located on different sides of the waveguide 1. The light L propagating in the waveguide 1 is totally reflected inside the free surface 12 and proceeds, and both total reflection and diffraction occur in the areas of location of the segments 11. The free surface 12 of the waveguide 1 may increase the distance between adjacent exit pupils, keep more light in the original direction of light propagation inside the waveguide 1 when the light passes through an area of the waveguide 1 in which the segments 11 are located, and increase the EMB area. In addition, an increase in the distance between the exit pupils which corresponds to a decrease in the density of the exit pupils leads to a decrease in the mutual influence of adjacent exit pupils on each other. As described with reference to FIG. 1, due to a decrease in the density of the exit pupils, a user always receives as few identical angular components as possible from different exit pupils, which makes it possible to use a waveguide with a smaller thickness without increasing quality requirements the surface of the waveguide 1, and increase the resolution (quality) of the displayed image and reduce the cost of production.

Figure 16:
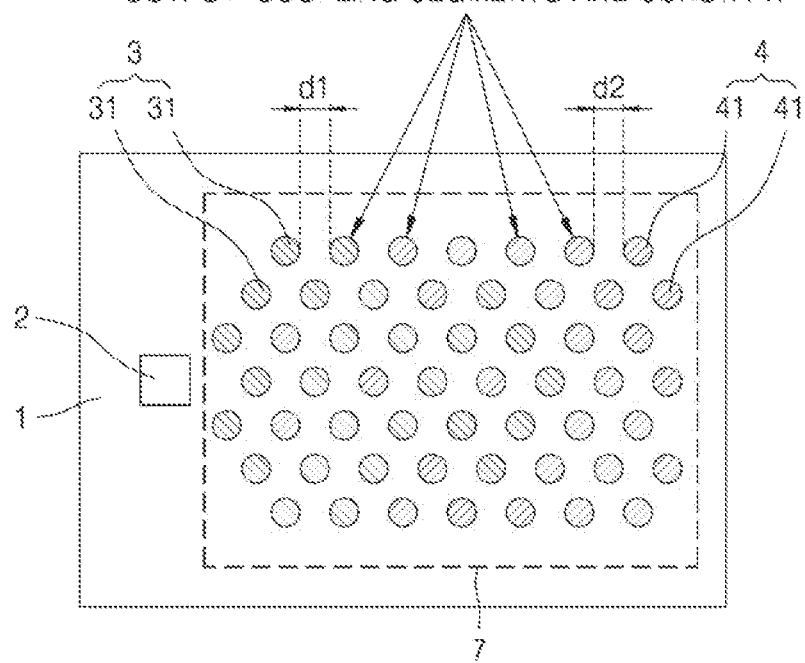
FIG. 16 is a diagram showing the distance between expanding and output-coupling segments according to an embodiment.

FIG. 16 is a diagram showing the distance between the expanding segments 31 and the output-coupling segments 41 according to an embodiment.

Referring to FIG. 16, in an embodiment, first distances d1 between the adjacent expanding segments 31 in the expanding DOE 3 are the same, second distances d2 between the adjacent output-coupling segments 41 in the output-coupling DOE 4 are the same, and the first distances d1 and the second distances d2 may be the same. For example, the expanding segments 31 and the output-coupling segments 41 may be arranged at equal distances.

In an embodiment, the first distances d1 between the adjacent expanding segments 31 in the expanding DOE 3 are the same, the second distances d2 between the adjacent output-coupling segments 41 in the output-coupling DOE 4 are the same, whereas the first distances d1 and the second distances d2 may not be the same.

Figure 17:
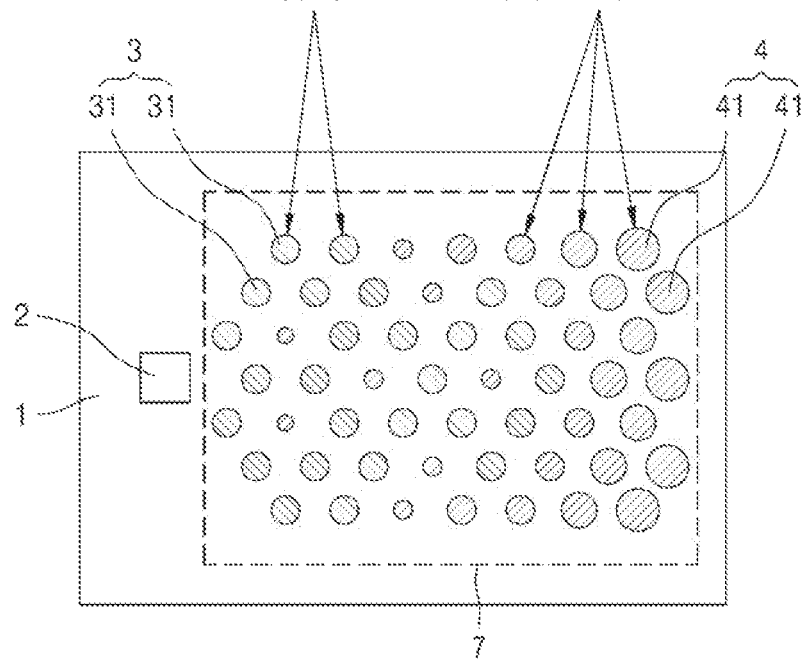
FIG. 17 is a diagram showing the distance between expanding and output-coupling segments according to an embodiment.

FIG. 17 is a diagram showing the distance between the expanding segments 31 and the output-coupling segments 41 according to an embodiment.

Referring to FIG. 17, first distances between the expanding segments 31 may be constant, and second distances between the output-coupling segments 41 may be different from each other. In an embodiment, the first distances between the adjacent expanding segments 31 in the expanding DOE 3 are the same, and the second distances between the adjacent output-coupling segments 41 in the output-coupling DOE 4 may vary depending on the coordinates on the surface of the waveguide 1.

In an embodiment, the first distances between the adjacent expanding segments 31 may vary depending on the coordinates on the surface of the waveguide 1, and the second distances between the adjacent output-coupling segments 41 may be the same.

Figure 18:
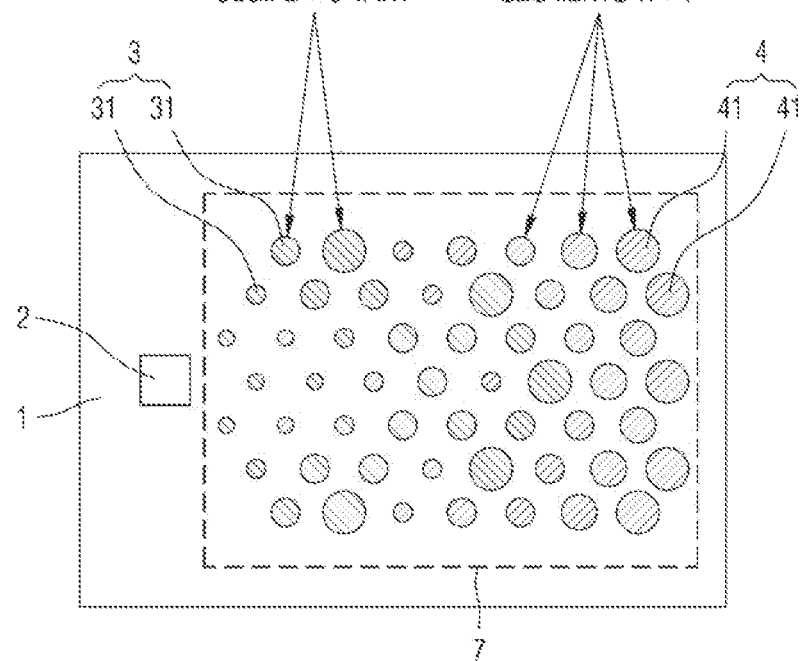
FIG. 18 is a diagram showing the distance between expanding and output-coupling segments according to an embodiment.

FIG. 18 is a diagram showing the distance between the expanding segments 31 and the output-coupling segments 41 according to an embodiment. Referring to FIG. 18, distances between the expanding segments 31 and the output-coupling segments 41 may be different from each other. The distances between the adjacent segments, for example, the adjacent expanding segments 31 or the adjacent output-coupling segments 41 of the expanding and output-coupling DOEs 3 and 4 or the distances between the adjacent expanding segment 31 and output-coupling segment 41 may vary depending on the coordinates on the surface of the waveguide 1. Varying the distances between the expanding segments 31 and the output-coupling segments 41 may provide additional control over the efficiency of the waveguide optical system.

Referring back to FIG. 15, in an embodiment, a distance d_h between the segments 11 may vary depending on the coordinates on the surface of the waveguide 1, may be proportional to a thickness T of the waveguide 1 and determined according to the following Equation 2, $$d\_h \sim (T/\tan(\alpha))*X - r\_h \qquad \text{[Equation 2]}$$

Here, T denotes the thickness of the waveguide 1, α denotes a beam propagation angle inside the waveguide 1, r_h denotes a size of the segment 11, and X is given by Equation 3 below.

$$X = (P/2)*(T/\tan(\alpha)) \qquad \text{[Equation 3]}$$

Here, P denotes a diameter of the user's eye pupil.

An angle α of beam propagation inside the waveguide 1 is a value that depends on the coordinates of a point on the surface of the waveguide 1 and is measured from the surface of the waveguide 1. In the waveguide 1 configured to output image, many beams propagate, each having its own angle of propagation. Once the beams are input in the output-coupling segments 41, many beams are output from the waveguide 1 in different directions. Here, the angle α of beam propagation inside the waveguide 1 for a given point of the waveguide 1 is understood as the angle α of the beam, which is the largest of the cone of beams output from this point of the waveguide 1 in the target direction to the user's eye into the EMB area.

In an embodiment, the distance d_h between the segments 11 may be determined according to Equation 4 below, $$d\_h \leq P - r\_h \qquad \text{[Equation 4]}$$

Here, P denotes a user's eye pupil diameter, and r_h denotes a size of the segment 11.

The sizes of the expanding segments 31 and the output-coupling segments 41 may be selected depending on the specific waveguide design such as the thickness of the waveguide 1 and technical requirements.

Figure 19:
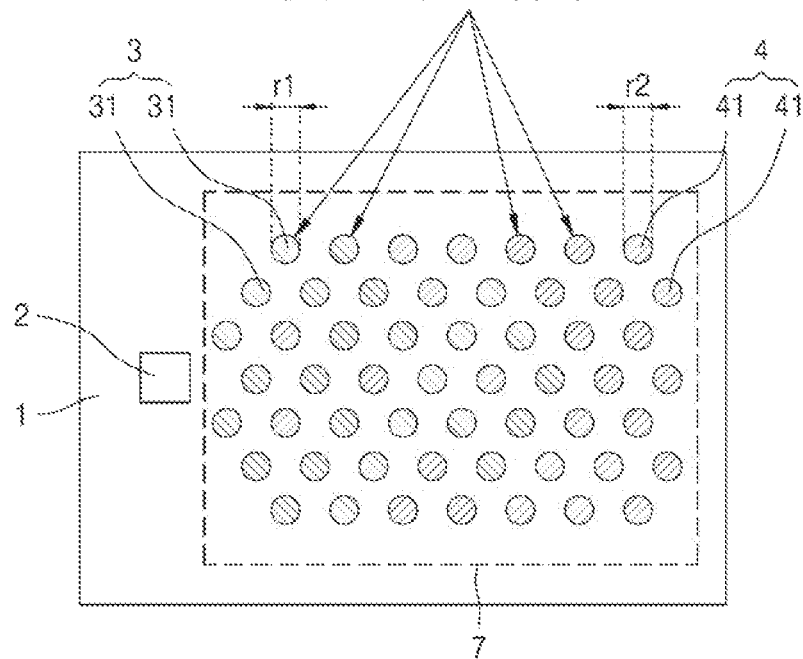
FIG. 19 is a diagram showing the size relationship of expanding and output-coupling segments according to an embodiment.

FIG. 19 is a diagram showing the size relationship of the expanding segments 31 and the output-coupling segments 41 according to an embodiment. Referring to FIG. 19, the expanding segments 31 may have the same first size r1, the output-coupling segments 41 may have the same second size r2, and the first size r1 and the second size r2 may be equal. The expanding segments 31 and the output-coupling segments 41 may be easier to implement because the expanding segments 31 and the output-coupling segments 41 have the same size.

In an embodiment, the expanding segments 31 may have the same first size r1, the output-coupling segments 41 may have the same second size r2, and the first size r1 and the second size r2 may not be equal. In this case, the expanding segments 31 and the output-coupling segments 41 may be easier to implement because only two segment sizes are required as expanding and output-coupling DOEs.

Figure 20:
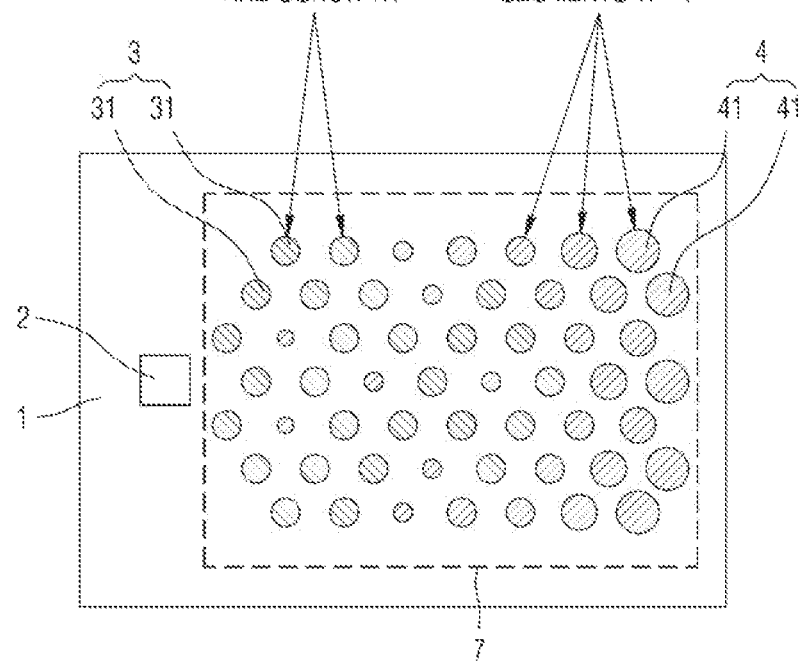
FIG. 20 is a diagram showing the size relationship of expanding and output-coupling segments according to an embodiment.

FIG. 20 is a diagram showing the size relationship of the expanding segments 31 and the output-coupling segments 41 according to an embodiment. Referring to FIG. 20, the sizes of the expanding segments 31 are constant whereas the sizes of at least some of the output-coupling segments 41 may be different from each other. The sizes of the output-coupling segments 41 may vary depending on the coordinates on the surface of the waveguide 1.

In an embodiment, the sizes of the output-coupling segments 41 may be the same, and the sizes of the expanding segments 31 may vary depending on the coordinates on the surface of the waveguide 1.

Figure 21:
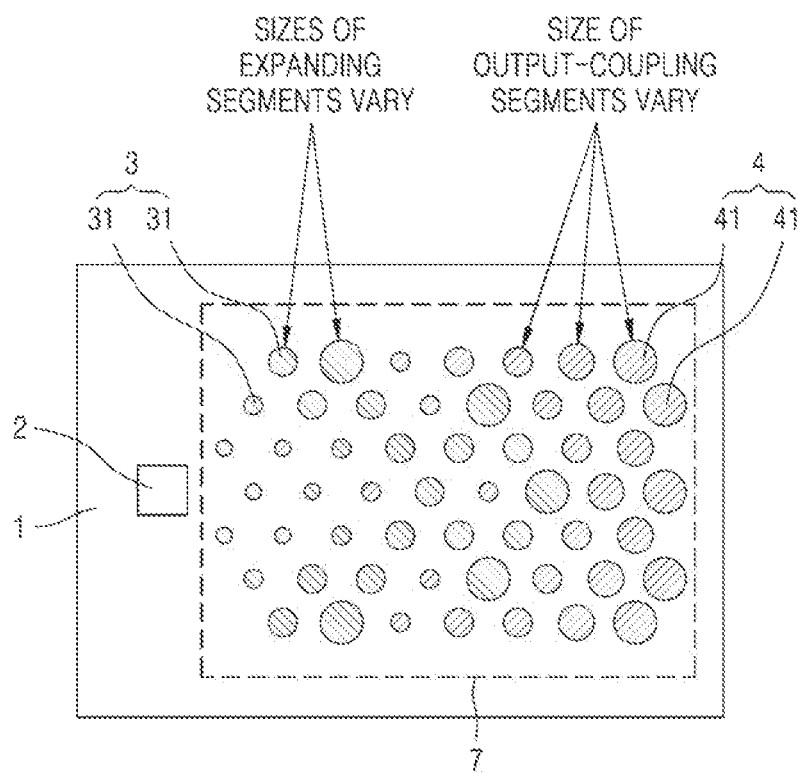
FIG. 21 is a diagram showing the size relationship of expanding and output-coupling segments according to an embodiment.

FIG. 21 is a diagram showing the size relationship of the expanding segments 31 and the output-coupling segments 41 according to an embodiment. Referring to FIG. 21, the sizes of at least some of the expanding segments 31 and the sizes of at least some of the output-coupling segments 41 may vary depending on the coordinates on the surface of the waveguide 1. The sizes of all or some of the expanding segments 31 and the output-coupling segments 41 may vary depending on the coordinates on the surface of the waveguide 1. As described above, the sizes of the expanding segments 31 and the output-coupling segments 41 vary depending on the coordinates on the surface of the waveguide 1, thereby providing additional control over the efficiency of the waveguide optical system.

In an embodiment, sizes r_h of the expanding segments 31 and/or the output-coupling segments 41 which vary depending on the coordinates on the surface of the waveguide 1 may be chosen according to the following Equation 5, $$r\_h \sim T/\tan(\alpha) \qquad \text{[Equation 5]}$$

Here, r_h denotes a segment size, T denotes a waveguide thickness, and α denotes a beam propagation angle inside the waveguide 1.

In an embodiment, the sizes r_h of the expanding segments 31 and/or the output-coupling segments 41 may be chosen according to the following Equation 6, $$r\_h \geq 1.5*T/\tan(\alpha) \qquad \text{[Equation 6]}$$

Here, r_h denotes a segment size, T denotes a waveguide thickness, and α denotes a beam propagation angle inside the waveguide 1.

Figure 22:
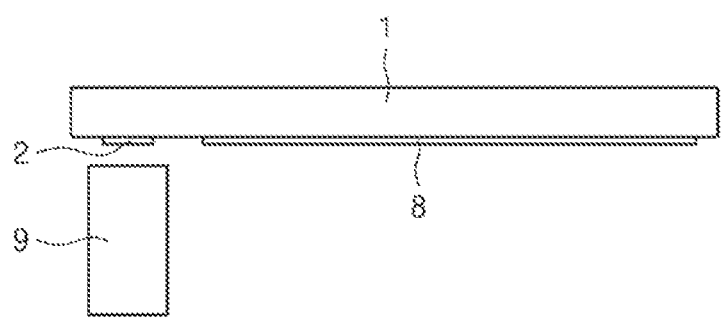
FIG. 22 is a diagram schematically illustrating a near-eye display apparatus according to an embodiment.

FIG. 22 is a diagram schematically illustrating a near-eye display apparatus according to an embodiment.

Referring to FIG. 22, the near-eye display apparatus according to an embodiment may include the waveguide 1 according to the embodiments described above. The waveguide 1 may include an input-coupling DOE 2 and a segmented DOE 8. Although the segmented DOE 8 is provided on one side of the waveguide 1 in FIG. 22, embodiments are not limited thereto. For example, the segmented DOE 8 may be provided on the other side of the waveguide 1 or may be provided on both sides of the waveguide 1. The segmented DOE 8 may be the expanding DOE 3 and the output-coupling DOE 4 of the embodiment described above, which may include the segmented and expanding segments 31 and/or the output-coupling segments 41.

The near-eye display apparatus may further include a projector 9 that projects light of an image (e.g., a virtual object). The light projected by the projector 9 is output to a target area through the waveguide 1. The target area may be a user's EMB.

The near-eye display apparatus may be an augmented reality device capable of expressing augmented reality or a virtual reality device capable of expressing virtual reality, and may include, for example, a glasses-shaped device worn by the user on the face, and a head mounted display (HMD) and an augmented reality helmet that are worn on the head.

Information processing and image formation for the projector 9 is performed directly by a computer of the near-eye display apparatus itself, or an external electronic device, such as a smart phone, tablet, computer, notebook, and all other intelligent (smart) devices, to which the near-eye display apparatus is connected. Signal transmission between the near-eye display apparatus and the external electronic device may be performed through wired communication and/or wireless communication. The near-eye display apparatus may receive power from at least one of a built-in power source (rechargeable battery), an external device, or an external power source.

As described above, the waveguide 1 may reduce the size and thickness of the waveguide 1 by segmenting the expanding and output-coupling DOEs 3 and 4, and accordingly, the near-eye display apparatus may increase resolution and quality of a displayed image, and make the size of the near-eye display apparatus compact. In addition, the near-eye display apparatus may improve uniformity of the displayed image, achieve high display efficiency, and increase an EMB area.

Figure 23:
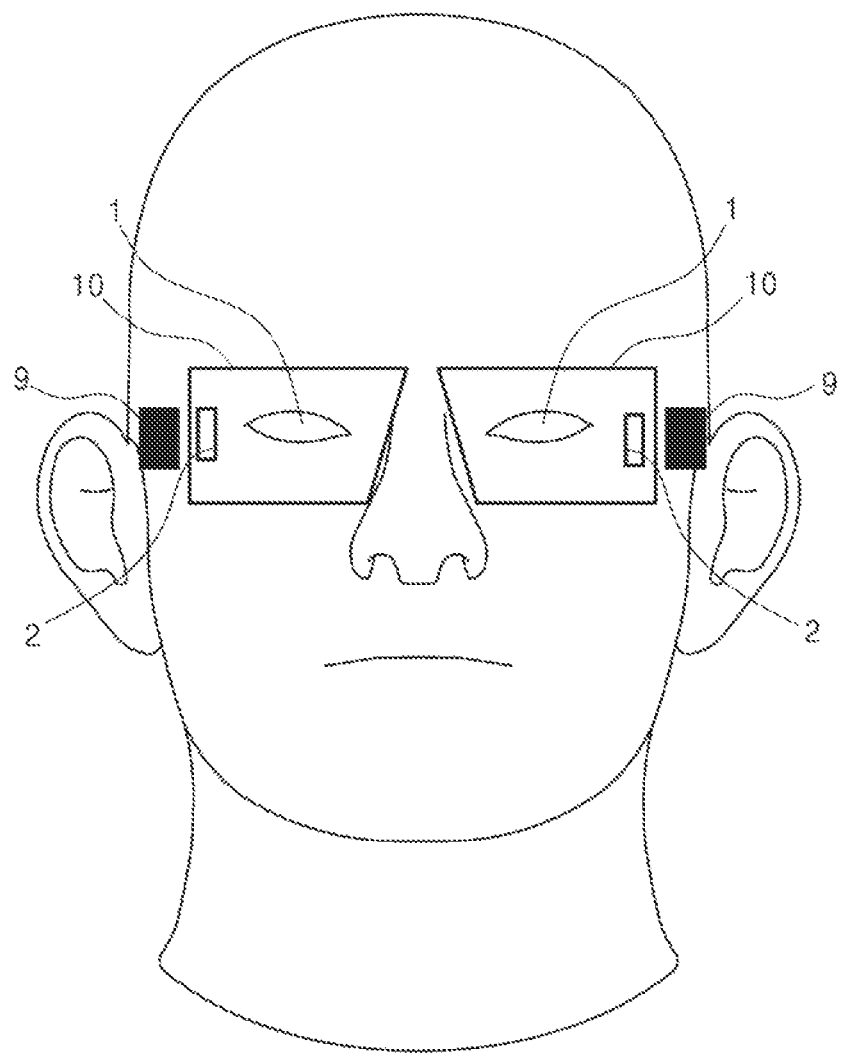
FIG. 23 is a diagram schematically illustrating augmented reality glasses according to an embodiment.

FIG. 23 is a diagram schematically illustrating augmented reality glasses according to an embodiment.

Referring to FIG. 23, the augmented reality glasses may use the near-eye display apparatus described with reference to FIG. 22 as a left eye element and a right eye element instead of a lens. For example, the augmented reality glasses may include the waveguide 1 and the projector 9 according to the embodiments described above for each of the left eye element and the right eye element. The waveguide 1 has the segmented DOE (8 in FIG. 22) and is fixed to a frame 10. The projector 9 is located near the temple of the user's head and fixed to the frame 10. The waveguide 1 includes the input-coupling DOE 2 for inputting light from the projector 9 to the waveguide 1. The waveguide 1 is arranged so that an area having the segmented DOE 8 is located opposite to the corresponding user's (wearer) eye. The projector 9 is located opposite to the input-coupling DOE 2.

According to the embodiments, the size of the waveguide may be reduced by at least partially superimposing segments or their location areas.

According to the embodiments, the waveguide of a smaller thickness may be used while securing image quality.

According to the embodiments, the waveguide may reduce the light loss, improve uniformity of an image, achieve high display efficiency, and increase an EMB area.

The waveguide and the near-eye display apparatus employing the same according to the embodiments may increase resolution of the displayed image, improve quality of the displayed image, reduce cost of production, and achieve compactness and lightweight.

While the waveguide structure with segmented DOEs and the near-eye display apparatus employing the same according to the disclosure have been shown and described with reference to the embodiments illustrated in the drawings to help understanding, this is merely an example and those of ordinary skill in the art that would understand that various modifications and equivalent other embodiments of the disclosure may be possible therefrom. Therefore, the true technical scope of the disclosure should be defined by the appended claims and their equivalents.

What is claimed is:

1. A waveguide guiding light to a target area, the waveguide comprising:
an input-coupling diffractive optical element (DOE) inputting the light into the waveguide;
an expanding DOE expanding the light input into the waveguide through the input-coupling DOE;
an output-coupling DOE outputting the light expanded in the waveguide by the expanding DOE to an outside of the waveguide,
wherein the expanding DOE comprises a plurality of expanding segments, and the output-coupling DOE comprises a plurality of output-coupling segments, and
wherein in all propagation directions of the light, as a distance from the input-coupling DOE increases, a density of each of the plurality of expanding segments decreases and a density of each of the plurality of output-coupling segments increases.

2. The waveguide of claim 1, wherein an area comprising the plurality of expanding segments on the waveguide and an area comprising the plurality of output-coupling segments on the waveguide at least partially intersect.

3. The waveguide of claim 2, wherein the plurality of expanding segments and the plurality of output-coupling segments do not intersect with each other.

4. The waveguide of claim 2, wherein at least one of the plurality of expanding segments partially intersects with at least one of the plurality of output-coupling segments.

5. The waveguide of claim 2, wherein at least one of the plurality of expanding segments is partially aligned with at least one of the plurality of output-coupling segments.

6. The waveguide of claim 1, wherein a diffraction efficiency of the plurality of expanding segments is equal to a diffraction efficiency of the plurality of output-coupling segments.

7. The waveguide of claim 1, wherein each of the plurality of expanding segments has a first diffraction efficiency, and each of the plurality of output-coupling segments has a second diffraction efficiency, and
wherein the first diffraction efficiency and the second diffraction efficiency are not equal to each other.

8. The waveguide of claim 1, wherein diffraction efficiencies of at least one of the plurality of expanding segments or the plurality of output-coupling segments vary based on locations of the at least one of the plurality of expanding segments or the plurality of output-coupling segments on a surface of the waveguide.

9. The waveguide of claim 1, wherein the plurality of expanding segments and/or the plurality of output-coupling segments have a circle shape, an arc shape, a sector shaper, a circle segment shape, or a polygon shape.

10. The waveguide of claim 1, wherein adjacent segments of the plurality of expanding segments and adjacent segments of the plurality of output-coupling segments are spaced apart from each other on the waveguide.

11. The waveguide of claim 10, wherein distances between the adjacent segments of the plurality of expanding segments and distances between the adjacent segments of the output-coupling segments are equal to each other.

12. The waveguide of claim 10, wherein distances between the adjacent expanding segments of the expanding DOE are respectively a first distance, and distances between the adjacent output-coupling segments of the output-coupling DOE are respectively a second distance, and
wherein the first distance is not equal to the second distance.

13. The waveguide of claim 10, wherein distances between the adjacent segments of at least one of the plurality of expanding segments or the plurality of output-coupling segments vary based on locations of the at least one of the plurality of expanding segments or the plurality of output-coupling segments on a surface of the waveguide.

14. The waveguide of claim 1, wherein a size of each of the plurality of expanding segments is equal to a size of each of the plurality of output-coupling segments.

15. The waveguide of claim 1, wherein a size of each of the plurality of expanding segments is a first size, and a size of each of the plurality of output-coupling segments is a second size, and
wherein the first size and the second size are not equal to each other.

16. The waveguide of claim 1, wherein sizes of at least one of the plurality of expanding segments or the plurality of output-coupling segments vary based on locations of the at least one of the plurality of expanding segments or the plurality of output-coupling segments on a surface of the waveguide.

17. The waveguide of claim 1, wherein a period and an effective thickness of each segment of the plurality of expanding segments and a period and an effective thickness of each of the plurality of output-coupling segments correspond to a location of the target area such that a diffraction efficiency of each segment is maximum with respect to the light output from the waveguide toward the target area.

18. The waveguide of claim 1, wherein diffraction efficiencies of the plurality of expanding segments or the plurality of output coupling segments are different according to positions the plurality of expanding segments or the plurality of output coupling segments.

19. A near-eye display apparatus comprising:
a projector projecting light of an image; and
a waveguide comprising:
   an input-coupling diffractive optical element (DOE) inputting the light into the waveguide;
   an expanding DOE expanding the light input into the waveguide by the input-coupling DOE;
   an output-coupling DOE outputting the light expanded by the expanding DOE in the waveguide to an outside of the waveguide,
   wherein the expanding DOE comprises a plurality of expanding segments, and the output-coupling DOE comprises a plurality of output-coupling segments,
   wherein in all propagation directions of the light, as a distance from the input-coupling DOE increases, a density of each of the plurality of expanding segments decreases and a density of each of the plurality of output-coupling segments increases, and
   wherein the waveguide guides the light projected by the projector to a target area, the target area being a user's eye motion box.

20. A near-eye display apparatus comprising:
a left eye element comprising a first projector projecting light of an image and a first waveguide; and
a right eye element comprising a second projector projecting light of an image and a second waveguide,
wherein each of the first waveguide and the second waveguide comprises:
   an input-coupling diffractive optical element (DOE) inputting the light into the waveguide;
   an expanding DOE expanding the light input into the waveguide by the input-coupling DOE;
   an output-coupling DOE outputting the light expanded by the expanding DOE in the waveguide to an outside of the waveguide,
   wherein the expanding DOE comprises a plurality of expanding segments, and the output-coupling DOE comprises a plurality of output-coupling segments,
   wherein in all propagation directions of the light, as a distance from the input-coupling DOE increases, a density of each of the plurality of expanding segments decreases and a density of each of the plurality of output-coupling segments increases, and
   wherein the waveguide is provided in each of the left eye element and the right eye element such that plurality of output-coupling segments outputting the light projected by the projector are provided opposite to an area comprising a user's eye.

* * * * *